(12) United States Patent
Nix et al.

(10) Patent No.: US 11,520,339 B2
(45) Date of Patent: *Dec. 6, 2022

(54) SYSTEMS AND METHODS FOR CHANGING A DESTINATION OF AN AUTONOMOUS VEHICLE IN REAL-TIME

(71) Applicant: UATC, LLC, San Francisco, CA (US)

(72) Inventors: Molly Castle Nix, San Francisco, CA (US); Sean Chin, Pittsburgh, PA (US); Dennis Zhao, Pittsburgh, PA (US); Joseph Maliksi, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 16/939,590

(22) Filed: Jul. 27, 2020

(65) Prior Publication Data
US 2020/0356098 A1     Nov. 12, 2020

Related U.S. Application Data

(63) Continuation of application No. 15/794,547, filed on Oct. 26, 2017, now Pat. No. 10,725,473.
(Continued)

(51) Int. Cl.
    *G05D 1/02*      (2020.01)
    *G06Q 10/04*      (2012.01)
    (Continued)

(52) U.S. Cl.
    CPC ....... *G05D 1/0212* (2013.01); *G01C 21/3415* (2013.01); *G05D 1/0088* (2013.01);
    (Continued)

(58) Field of Classification Search
    CPC ............... G05D 1/0212; G05D 1/0088; G01C 21/3415; G06Q 10/02; G06Q 10/047;
    (Continued)

(56) References Cited

U.S. PATENT DOCUMENTS

| 4,405,943 | A | 9/1983 | Kanalv |
| 6,405,132 | B1 | 6/2002 | Breed |

(Continued)

FOREIGN PATENT DOCUMENTS

| CN | 105988478 | 10/2016 |
| CN | 106485340 | 3/2017 |

(Continued)

OTHER PUBLICATIONS

Qudsia et al., "Self-Driving and Driver Relaxing Vehicle," 2016, Publisher: IEEE.*

(Continued)

*Primary Examiner* — Tuan C To
(74) *Attorney, Agent, or Firm* — Dority & Manning, P.A.

(57) ABSTRACT

Systems and methods for controlling an autonomous vehicle are provided. In one example embodiment, a computer-implemented method includes receiving data representing a first location associated with a service request. The method includes controlling the autonomous vehicle to travel in accordance with a first route that leads to the first location. The method includes determining a second location for the service request when the autonomous vehicle is en route to the first location. The method includes controlling the autonomous vehicle to provide the requested service at the second location.

20 Claims, 12 Drawing Sheets

Related U.S. Application Data

(60) Provisional application No. 62/553,240, filed on Sep. 1, 2017.

(51) Int. Cl.
*G01C 21/34* (2006.01)
*G08G 1/00* (2006.01)
*G06Q 50/30* (2012.01)
*G08G 1/005* (2006.01)
*G06Q 10/02* (2012.01)
*G08G 1/14* (2006.01)
*G05D 1/00* (2006.01)

(52) U.S. Cl.
CPC ............ *G06Q 10/02* (2013.01); *G06Q 10/047* (2013.01); *G06Q 50/30* (2013.01); *G08G 1/005* (2013.01); *G08G 1/143* (2013.01); *G08G 1/147* (2013.01); *G08G 1/202* (2013.01)

(58) Field of Classification Search
CPC ........ G06Q 50/30; G08G 1/005; G08G 1/143; G08G 1/202
USPC ........................................................ 701/25
See application file for complete search history.

(56) References Cited

U.S. PATENT DOCUMENTS

| | | | |
|---|---|---|---|
| 7,359,004 B2 | 4/2008 | Yu | |
| 8,370,392 B1 | 2/2013 | Hunt | |
| 8,601,595 B2 | 12/2013 | Gelvin | |
| 9,384,402 B1 | 7/2016 | Furman | |
| 9,494,439 B1 | 11/2016 | Ross et al. | |
| 9,507,346 B1 | 11/2016 | Levinson | |
| 9,613,386 B1 | 4/2017 | Arden et al. | |
| 9,679,489 B2 | 6/2017 | Lambert | |
| 9,754,490 B2 * | 9/2017 | Kentley | G05D 1/0088 |
| 9,978,282 B2 * | 5/2018 | Lambert | G01C 21/3438 |
| 10,255,816 B2 * | 4/2019 | Bartel | B60W 50/0098 |
| 10,303,173 B2 * | 5/2019 | Rander | G05D 1/0217 |
| 10,467,554 B2 * | 11/2019 | Yoo | H04W 4/024 |
| 10,514,690 B1 * | 12/2019 | Siegel | G05D 1/102 |
| 10,846,633 B2 * | 11/2020 | Magazinik | G06Q 50/32 |
| 2004/0093280 A1 | 5/2004 | Yamaguchi | |
| 2006/0034201 A1 | 2/2006 | Umeda | |
| 2007/0185646 A1 | 8/2007 | Neuqebauer | |
| 2010/0169199 A1 | 7/2010 | Fuller | |
| 2011/0099040 A1 | 4/2011 | Feit | |
| 2011/0208417 A1 | 8/2011 | Fink | |
| 2011/0225269 A1 * | 9/2011 | Yap | G06Q 10/06 709/219 |
| 2011/0301985 A1 | 12/2011 | Camp | |
| 2013/0102333 A1 | 4/2013 | Dam | |
| 2013/0179205 A1 * | 7/2013 | Slinin | G06Q 10/06 705/7.13 |
| 2014/0188775 A1 * | 7/2014 | Lehmann | G01C 21/3438 706/46 |
| 2015/0161564 A1 | 6/2015 | Sweeney | |
| 2015/0178953 A1 | 6/2015 | Gao | |
| 2015/0244826 A1 | 8/2015 | Stenneth | |
| 2015/0248131 A1 | 9/2015 | Fairfield | |
| 2015/0254986 A1 | 9/2015 | Fairfield et al. | |
| 2016/0139594 A1 | 5/2016 | Okumura | |
| 2016/0209843 A1 | 7/2016 | Meuleau et al. | |
| 2016/0214535 A1 | 7/2016 | Penilla et al. | |
| 2016/0358475 A1 | 12/2016 | Prokhorov | |
| 2017/0123421 A1 | 5/2017 | Kentley et al. | |
| 2017/0192423 A1 | 7/2017 | Rust | |
| 2017/0193627 A1 | 7/2017 | Urmson | |
| 2017/0223712 A1 | 8/2017 | Stephens | |
| 2017/0365030 A1 | 12/2017 | Shoham | |
| 2018/0181118 A1 | 6/2018 | Yoneda | |
| 2018/0238694 A1 | 8/2018 | Bellotti | |
| 2018/0257661 A1 | 9/2018 | Kroop | |
| 2018/0281815 A1 | 10/2018 | Stetilz | |
| 2018/0284793 A1 * | 10/2018 | Wood | B60K 28/12 |
| 2018/0293687 A1 * | 10/2018 | Hardee | G08G 1/202 |
| 2018/0341274 A1 * | 11/2018 | Donnelly | G01C 21/3438 |
| 2018/0342033 A1 * | 11/2018 | Kislovskiy | G01C 21/3697 |
| 2018/0342035 A1 * | 11/2018 | Sweeney | G05D 1/0088 |
| 2018/0342157 A1 * | 11/2018 | Donnelly | G08G 1/09626 |
| 2018/0374002 A1 * | 12/2018 | Li | G06Q 10/02 |
| 2019/0011931 A1 * | 1/2019 | Selvam | G08G 1/202 |
| 2019/0043001 A1 | 2/2019 | Woulfe | |

FOREIGN PATENT DOCUMENTS

| | | | |
|---|---|---|---|
| CN | 107024218 | 8/2017 | |
| GB | 2544815 A * | 5/2017 | ............ B60W 50/08 |
| JP | 2008/009913 | 1/2008 | |
| JP | 2016/091411 | 5/2016 | |
| WO | WO-2017079222 A1 * | 5/2017 | ............. B60L 15/20 |

OTHER PUBLICATIONS

Hsu et al., "Route planning of automated guided vehicles," 1994, Publisher: IEEE.*
PCT International Search Report and Written Opinion for PCT/US2018/048091, dated Nov. 30, 2018, 12 pages.
Fong, Terrence et al., "Vehicle teleoperation interfaces", Autonomous Robots 11, pp. 9-18, 2001.
Reuschenbach, Arturo et al., "iDriver—human machine interface for autonomous cars", 2011 Eighth International Conference on Infonnation Technology: New Generations, Las Vegas, NV 2011. pp. 435-440.

* cited by examiner

SYSTEMS AND METHODS FOR CHANGING A DESTINATION OF AN AUTONOMOUS VEHICLE IN REAL-TIME

PRIORITY CLAIM

The present application is a continuation of U.S. application Ser. No. 15/794,547 having a filing date of Oct. 26, 2017, which claims the benefit of U.S. Provisional Application Ser. No. 62/553,240 filed Sep. 1, 2017. Applicant claims priority to and the benefit of each of such applications and incorporate all such applications herein by reference in its entirety.

FIELD

The present disclosure relates generally to changing a destination of an autonomous vehicle in real-time.

BACKGROUND

An autonomous vehicle is a vehicle that is capable of sensing its environment and navigating with little or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of the present disclosure will be set forth in part in the following description, or may be learned from the description, or may be learned through practice of the embodiments.

One example aspect of the present disclosure is directed to a computer-implemented method for controlling an autonomous vehicle. The method includes receiving, by a computing system comprising one or more computing devices, data representing a first location associated with a service request. The method includes controlling, by the computing system, the autonomous vehicle to travel in accordance with a first route that leads to the first location. The method includes determining, by the computing system, a second location for the service request when the autonomous vehicle is en route to the first location. The method includes controlling, by the computing system, the autonomous vehicle to provide the requested service at the second location.

Another example aspect of the present disclosure is directed to a computing system for controlling an autonomous vehicle. The computing system includes one or more processors and one or more tangible, non-transitory, computer readable media that collectively store instructions that when executed by the one or more processors cause the computing system to perform operations. The operations include receiving data representing a first location associated with a service request. The operations include controlling the autonomous vehicle to travel in accordance with a first route that leads to the first location. The operations include determining a second location for the service request when the autonomous vehicle is en route to the first location. The operations include controlling the autonomous vehicle to provide the requested service at the second location.

Yet another example aspect of the present disclosure is directed to an autonomous vehicle. The autonomous vehicle includes one or more vehicle input devices. The autonomous vehicle includes one or more processors and one or more tangible, non-transitory, computer readable media that collectively store instructions that when executed by the one or more processors cause the autonomous vehicle to perform operations. The operations include receiving data representing a first location associated with a service request. The operations include controlling the autonomous vehicle to travel in accordance with a first route that leads to the first location. The operations include determining a second location for the service request when the autonomous vehicle is en route to the first location. The operations include controlling the autonomous vehicle to provide the requested service at the second location.

Other example aspects of the present disclosure are directed to systems, methods, vehicles, apparatuses, tangible, non-transitory computer-readable media, and memory devices for controlling an autonomous vehicle.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth below, which make reference to the appended figures, in which.

DETAILED DESCRIPTION

Figure 1:
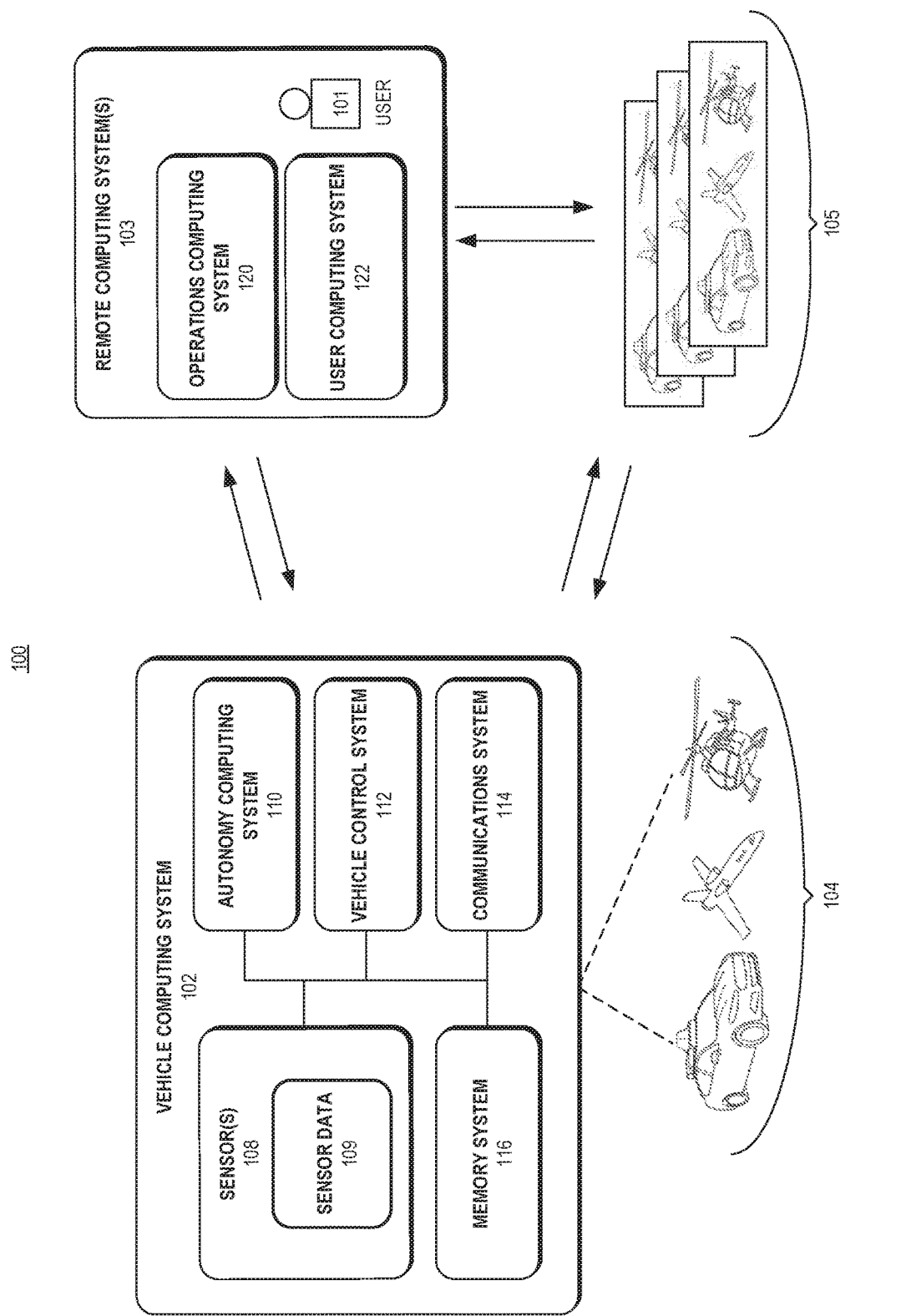
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to changing a destination of an autonomous vehicle in real-time. In particular, an entity (e.g., service provider) can use a fleet of autonomous vehicles to provide a vehicle service (e.g., transportation service, delivery service, courier service, etc.) to a plurality of users. The fleet can include, for example, autonomous vehicles that can drive, navigate, operate, etc. with minimal and/or no interaction from a human. For example, an autonomous vehicle can receive data indicative of a location (e.g., first location) associated with a vehicle service requested by a user, such as a transportation service. The autonomous vehicle can autonomously navigate to the location and park to allow the user access to the autonomous vehicle. However, the autonomous vehicle may not be able to park at the first location because the first location is obstructed, occupied, unsafe, etc. For example, one or more other vehicles can occupy available parking spots when the autonomous vehicle arrives at the first location. The present disclosure enables the autonomous vehicle to determine a second location (e.g., with available parking spots) and change its destination from the first location to the second location, in real-time while the autonomous vehicle is en route to the first location. In other situations, the user can choose to change a location associated with the user's service request. For example, if a user identifies an autonomous vehicle that is en route to a location associated with the user's service request, then the user can decide that it is more convenient for the autonomous vehicle to park near the user's current location instead. Alternatively, a user can choose to change a location associated with the user's service request for any reason, and determine another location of his or her choosing. The present disclosure enables the autonomous vehicle to accommodate a user's request to change its destination from a first location to second location, in real-time while the autonomous vehicle is en route to the first location.

More particularly, the entity (e.g., service provider, owner, manager) can use one or more vehicles (e.g., ground-based vehicles) to provide a vehicle service such as a transportation service (e.g., rideshare service), a courier service, a delivery service, etc. The vehicle(s) can be autonomous vehicles that include various systems and devices configured to control the operation of the vehicle. For example, an autonomous vehicle can include an on-board vehicle computing system for operating the vehicle (e.g., located on or within the autonomous vehicle). The vehicle computing system can receive sensor data from sensor(s) on-board the vehicle (e.g., cameras, LIDAR, RADAR), attempt to comprehend the vehicle's surrounding environment by performing various processing techniques on the sensor data, and generate an appropriate motion plan through the vehicle's surrounding environment. Moreover, the autonomous vehicle can be configured to communicate with one or more computing devices that are remote from the vehicle. For example, the autonomous vehicle can communicate with an operations computing system that can be associated with the entity. The operations computing system can help the entity monitor, communicate with, manage, etc. the fleet of vehicles. As another example, the autonomous vehicle can communicate with a user computing system (e.g., mobile phone, mobile computer, desktop computer, etc.) that can be associated with a user. As yet another example, the autonomous vehicle can communicate with a computing system of one or more other autonomous vehicles. In some implementations, the operations computing system can mediate communication between the autonomous vehicle and other remote computing systems (e.g., user computing system, vehicle computing system of another autonomous vehicle, etc.).

A user of the entity's vehicle service can create a service request for an autonomous vehicle. For instance, a user can provide (e.g., via a user device) a request to the operations computing system of an entity (e.g., service provider, manager, owner) that is associated with the autonomous vehicle. The request can indicate the type of vehicle service that the user desires (e.g., a transportation service, a delivery service, a courier service, etc.), a location associated with the service request (e.g., a current location of the user, a different location, etc.), an identifier (e.g., phone number, Bluetooth, WiFi, Cellular, other data that can be used to contact the user, etc.) associated with the user device that provided the request, and/or other information.

The operations computing system can process the request and select an autonomous vehicle to provide the requested vehicle service to the user. The operations computing system can provide, to the autonomous vehicle, data indicative of a location to which the autonomous vehicle is to travel. The location can be associated with a vehicle service requested by a user. For example, the location can be the current location of the user and/or a different location, such as for example a location at which the user would like to be picked up by the autonomous vehicle, provide an item to the autonomous vehicle, retrieve an item from the autonomous vehicle, etc. The location can be expressed as a coordinate (e.g., GPS coordinate, latitude-longitude coordinate pair), an address, a place name, and/or other geographic reference that can be used to identify the location.

The autonomous vehicle can obtain, from the operations computing system, data indicative of the location associated with a service request. The autonomous vehicle can also obtain a first vehicle route that leads to the location associated with the service request. The first vehicle route can be, for example, a route from the current location of the vehicle to the location associated with the user. In some implementations, the operations computing system can provide the first vehicle route to the autonomous vehicle. Additionally, or alternatively, the on-board vehicle computing system of the autonomous vehicle can determine the first vehicle route.

According to an aspect of the present disclosure, an autonomous vehicle can determine a second location for a service request, while the autonomous vehicle is en route to a first location associated with the service request. For example, an autonomous vehicle can determine a second location if the initial location is occupied (e.g., based on sensor data), obstructed (e.g., based on sensor data), or unsafe (e.g., due to crime, construction work, proximity to hazards, etc.).

In some implementations, the autonomous vehicle can determine a second location based on sensor data obtained by the autonomous vehicle and/or sensor data obtained by one or more other autonomous vehicles. For example, an autonomous vehicle can communicate with one or more other autonomous vehicles to obtain relevant sensor data obtained by the one or more other autonomous vehicles. The autonomous vehicle can use the sensor data to determine a second location in the surrounding environment that is not occupied or obstructed.

In some implementations, the autonomous vehicle can determine a second location for a service request based on a location database. The location database can include one or more preferred locations for the autonomous vehicle to service a user's request. The location database can be populated based on one or more criteria. For example, a location database can be populated with locations associated with low crime, reserved parking spots, ample street lights, etc. The autonomous vehicle can determine the second location from among the one or more locations in the location database that is nearest to the first location.

The autonomous vehicle can communicate the second location to the user, and travel to the second location instead. In some implementations, the autonomous vehicle can wait for the user to acknowledge and confirm the second location (e.g., via a user computing system, smartphone application, user device, etc.) before traveling there. In some implementations, if the user does not confirm the second location, then the autonomous vehicle can enter a holding pattern in a vicinity of the first location.

According to an aspect of the present disclosure, a user can determine a second location for a service request, while an autonomous vehicle is en route to a first location associated with the service request. For example, a user can determine a second location that is closer, quicker, or more accessible than a first location. The user can communicate the second location to the operations computing system or the autonomous vehicle (e.g., via a user computing system, smartphone application, user device, etc.). The autonomous vehicle can obtain, from the operations computing system, data indicative of the second location associated with the service request. The autonomous vehicle can also obtain a second vehicle route that leads to the second location associated with the service request. The second vehicle route can be, for example, a route from the current location of the vehicle to the second location associated with the service request. In some implementations, the operations computing system can provide the second vehicle route to the autonomous vehicle. Additionally, or alternatively, the on-board vehicle computing system of the autonomous vehicle can determine the second vehicle route. In some implementations, if the second location is occupied, obstructed, or unsafe, then the autonomous vehicle can determine a third location that is nearest to the second location.

According to an aspect of the present disclosure, a computing system (e.g., vehicle computing system, operations computing system, user computing system) can store data representing each change of location associated with a service request. The data can include, for example, a first location associated with a service request, a second location associated with a service request, whether the second location is determined by an autonomous vehicle or user, and one or more reasons for the change. The data can be aggregated at one computing system, distributed among one or more computing systems, or copied among each computing system. A computing system can analyze the data to provide additional context for improving a response to a future service request. For example, the data can indicate that there is a low probability of finding a parking spot at location A, and a higher probability of finding a parking spot at nearby location B. If another user requests a vehicle service at location A in the future, then an autonomous vehicle can determine location B as a second location for the service request. As another example, one or more users can request a vehicle service at location C, and change it to location D because location C is blocked off for construction work. If another user requests a vehicle service at location C in the future, then an autonomous vehicle can determine location D as a second location for the service request. Alternatively, another user can be prevented from requesting a vehicle service at location C in the future, until the construction work is finished. As yet another example, one or more users can request a vehicle service at a location E by selecting location E on a map displayed to each user, but access the vehicle at location F. If another user requests a vehicle service at location E in the future, then an autonomous vehicle can determine location F as a second location for the service request.

The systems and methods described herein provide a number of technical effects and benefits. Systems and methods for changing a service location for providing a vehicle service can have a technical effect of improving efficiency in resource management. By enabling an autonomous vehicle, or another computing system, to change a service location from a first location to a second location, the autonomous vehicle can adapt to a changing environment and/or conditions. This can allow the autonomous vehicle to service a user at a location that is closer, quicker, or more accessible than the first location at the time providing the service.

Additionally, by enabling an autonomous vehicle to determine a second location from a location database of preferred locations, the autonomous vehicle can lower a probability that the second location will be changed again (e.g., to a third, fourth, fifth, . . . , n-th location). This can improve a user's experience and reduce overhead. Furthermore, the preferred locations can provide greater safety and security to the user, and increase the user's confidence in the service provider.

The systems and methods of the present disclosure also provide an improvement to vehicle computing technology, such as autonomous vehicle computing technology. For instance, the systems and methods herein enable the vehicle technology to automatically determine an alternate location for providing a vehicle service to a user. For example, the systems and methods can allow one or more computing system(s) on-board an autonomous vehicle (and/or off-board a vehicle) to determine and implement an alternate location, and improve a response to a future service request. As described herein, an autonomous vehicle can be configured to provide data indicative of the alternate location to one or more other computing system(s) (e.g., operations computing system, user computing system, etc.). This allows the autonomous vehicle to more effectively and safely perform autonomous navigation.

Example Embodiments

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 104. The system 100 can also include one or more additional vehicle(s) 105, each including a respective vehicle computing system (not shown).

In some implementations, the system 100 can include one or more remote computing system(s) 103 that are remote from the vehicle 104 and the additional vehicle(s) 105. The remote computing system(s) 103 can include an operations computing system 120, and/or a user computing system 122. The remote computing system(s) 103 can be separate from one another or share computing device(s). The operations computing system 120 can remotely manage the vehicle 104 and/or additional vehicle(s) 105. For example, the operations computing system 120 can be associated with an entity that offers a vehicle service (e.g., a transportation service) to one or more users.

The user computing system 122 can be associated with a user 101, and can communicate with the vehicle computing system 102. For example, the user 101 can request a first vehicle service via the user computing system 122 (e.g., a mobile phone device). In some implementations, the user 101 can generate a service request via a software application on the user computing system 122. The user computing system 122 can provide data indicative of the service request to the operations computing system 120 (e.g., which can assign the vehicle 104 to such a request) and/or to the vehicle computing system 102. In response to the request, the vehicle computing system 102 can control the vehicle 104 to travel to a first location associated with the request. As another example, the vehicle computing system 102 (and/or the operations computing system 120) can determine an estimated time of arrival to the first location, and provide the estimated time to the user computing system 122 by sending a push notification to the user computing system 122. In some implementations, the user computing system 122 can remotely manage the vehicle 104. For example, the user 101 can change a destination of the vehicle 104 by providing data indicative of a new destination to the vehicle computing system 102 via the user computing system 122.

In some implementations, the user computing system 122 can change the destination of the vehicle 104 via communication with the operations computing system 120. For example, the user 101 (e.g., via the user computing system 122) can communicate a second location corresponding to the first service request to the operations computing system 120 (e.g., a request for the first vehicle service to be provided at the second location instead of the first location). The operations can cause the vehicle 104 to travel to the second location by providing the vehicle computing system 102 with data indicative of the second location. Accordingly, the vehicle computing system 102 can control the vehicle 104 to travel to the second location, as described herein.

The vehicle 104 incorporating the vehicle computing system 102 can be a ground-based autonomous vehicle (e.g., car, truck, bus), an air-based autonomous vehicle (e.g., airplane, drone, helicopter, or other aircraft), or other types of vehicles (e.g., watercraft). The vehicle 104 can be an autonomous vehicle that can drive, navigate, operate, etc. with minimal and/or no interaction from a human driver.

The vehicle computing system 102 can include one or more computing device(s) located on-board the vehicle 104 (e.g., located on and/or within the vehicle 104). The computing device(s) can include various components for performing various operations and functions. For instance, the computing device(s) can include one or more processor(s) and one or more tangible, non-transitory, computer readable media. The one or more tangible, non-transitory, computer readable media can store instructions that when executed by the one or more processor(s) cause the vehicle 104 (e.g., its computing system, one or more processors, etc.) to perform operations and functions, such as those described herein.

As shown in FIG. 1, the vehicle 104 can include one or more sensors 108, an autonomy computing system 110, a vehicle control system 112, a communications system 114, and a memory system 116. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

The sensor(s) 108 can be configured to acquire sensor data 109 associated with one or more objects that are proximate to the vehicle 104 (e.g., within a field of view of one or more of the sensor(s) 108). The sensor(s) 108 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 109 can include image data, radar data, LIDAR data, and/or other data acquired by the sensor(s) 108. The object(s) can include, for example, pedestrians, vehicles, bicycles, and/or other objects. The object(s) can be located in front of, to the rear of, and/or to the side of the vehicle 104. The sensor data 109 can be indicative of locations associated with the object(s) within the surrounding environment of the vehicle 104 at one or more times. The sensor(s) 108 can provide the sensor data 109 to the autonomy computing system 110.

Figure 2:
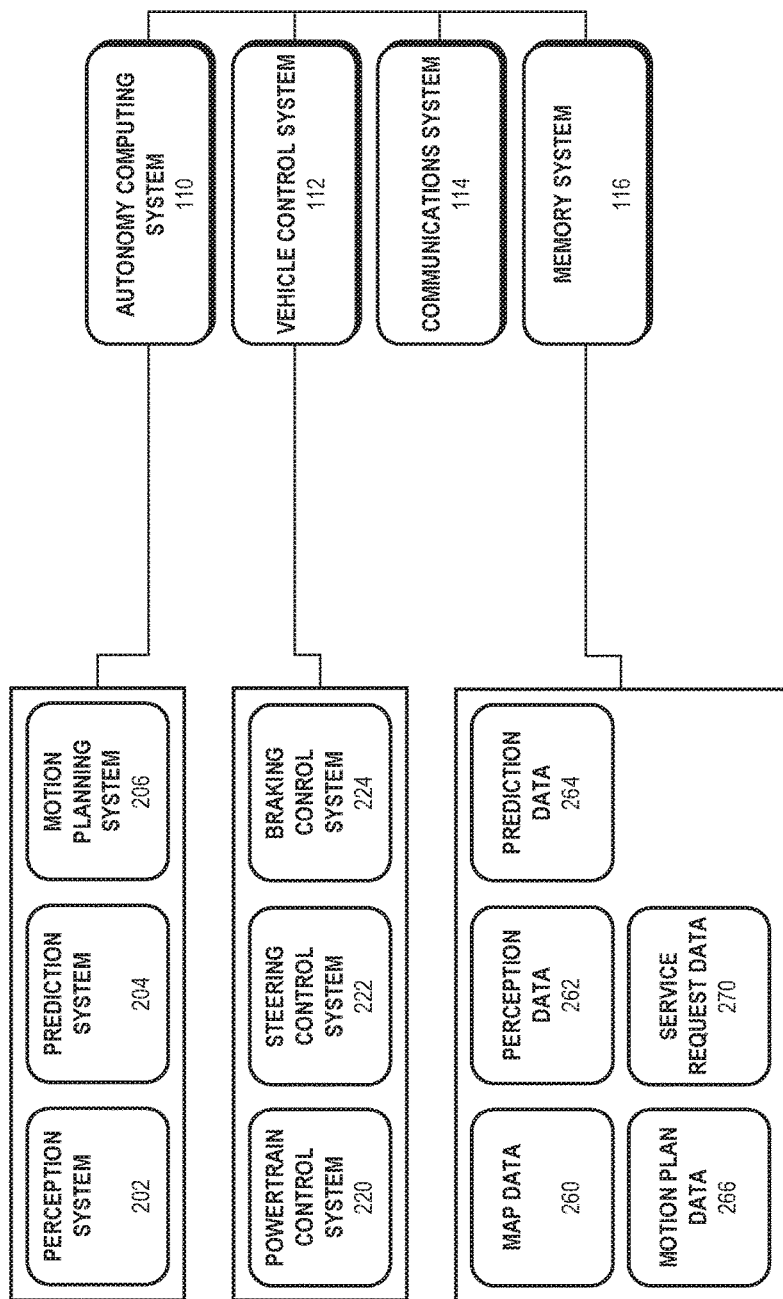
FIG. 2 depicts an example computing system for controlling an autonomous vehicle according to example embodiments of the present disclosure.

As shown in FIG. 2, the autonomy computing system 110 can include a perception system 202, a prediction system 204, a motion planning system 206, and/or other systems that cooperate to perceive the surrounding environment of the vehicle 104 and determine a motion plan for controlling the motion of the vehicle 104 accordingly. For example, the autonomy computing system 110 can receive the sensor data 109 from the sensor(s) 108, attempt to comprehend the surrounding environment by performing various processing techniques on the sensor data 109 (and/or other data), and generate an appropriate motion plan through such surrounding environment. The autonomy computing system 110 can control the one or more vehicle control systems 112 to operate the vehicle 104 according to the motion plan.

The autonomy computing system 110 can identify one or more objects that are proximate to the vehicle 104 based at least in part on the sensor data 109 and/or the map data 260. For instance, the perception system 202 can perform various processing techniques on the sensor data 109 to determine perception data 262 that is descriptive of a current state of one or more object(s) that are proximate to the vehicle 104. The prediction system 204 can create prediction data 264 associated with each of the respective one or more object(s) proximate to the vehicle 104. The prediction data 264 can be indicative of one or more predicted future locations of each respective object. The motion planning system 206 can determine a motion plan for the vehicle 104 based at least in part on the prediction data 264 (and/or other data), and save the motion plan as motion plan data 266. The motion plan data 266 can include vehicle actions with respect to the object(s) proximate to the vehicle 104 as well as the predicted movements. The motion plan data 266 can include a planned trajectory, speed, acceleration, etc. of the vehicle 104.

The motion planning system 206 can provide at least a portion of the motion plan data 266 that indicates one or more vehicle actions, a planned trajectory, and/or other operating parameters to the vehicle control system 112 to implement the motion plan for the vehicle 104. For instance, the vehicle 104 can include a mobility controller configured to translate the motion plan data 266 into instructions. By way of example, the mobility controller can translate the motion plan data 266 into instructions to adjust the steering of the vehicle 104 "X" degrees, apply a certain magnitude of braking force, etc. The mobility controller can send one or more control signals to the responsible vehicle control sub-system (e.g., powertrain control system 220, steering control system 222, braking control system 224) to execute the instructions and implement the motion plan.

The communications system 114 can allow the vehicle computing system 102 (and its computing system(s)) to communicate with other computing systems (e.g., remote computing system(s) 103, additional vehicles 105). The vehicle computing system 102 can use the communications system 114 to communicate with the operations computing system 120 and/or one or more other remote computing system(s) (e.g., the user computing system 122) over one or more networks (e.g., via one or more wireless signal connections). In some implementations, the communications system 114 can allow communication among one or more of the system(s) on-board the vehicle 104. The communications system 114 can include any suitable sub-systems for interfacing with one or more network(s), including, for example, transmitters, receivers, ports, controllers, antennas, and/or other suitable sub-systems that can help facilitate communication.

The memory system 116 of the vehicle 104 can include one or more memory devices located at the same or different locations (e.g., on-board the vehicle 104, distributed throughout the vehicle 104, off-board the vehicle 104, etc.). The vehicle computing system 102 can use the memory system 116 to store and retrieve data/information. For instance, the memory system 116 can store map data 260, perception data 262, prediction data 264, motion plan data 266, and service request data 270.

The map data 260 can include information regarding: an identity and location of different roadways, road segments, buildings, or other items or objects (e.g., lampposts, crosswalks, curbing, etc.); a location and direction of traffic lanes (e.g., the location and direction of a parking lane, a turning lane, a bicycle lane, or other lanes within a particular roadway or other travel way and/or one or more boundary markings associated therewith); and/or any other data that assists the vehicle computing system 102 in comprehending and perceiving its surrounding environment and its relationship thereto.

The service request data 270 can include data associated with a service request and/or data representing each change of location associated with a service request. The service request data 270 can include, for example, data representing one or more service requests (e.g., a first service request, second service request, third service request, etc.). In particular, the service request data 270 can include a type of vehicle service that is requested by each service request (e.g., a transportation service, a delivery service, a courier service, etc.), one or more locations associated with each service request (e.g., a first location associated with the first service request, a second location associated with the first service request, a third location associated with the first service request, etc.), and an identifier (e.g., phone number, Bluetooth, WiFi, Cellular, other data that can be used to contact the user, etc.) associated with the user computing system 122 that provides the request, and/or other information. The service request data 270 can further include data indicating whether a change of location associated with a service request is determined by the user 101, vehicle computing system 102, operations computing system 120, or some other entity; and one or more reason(s) for each change of location. The service request data 270 can be aggregated at one computing system, distributed among one or more computing system(s), or copied among each computing system.

Figure 3A:
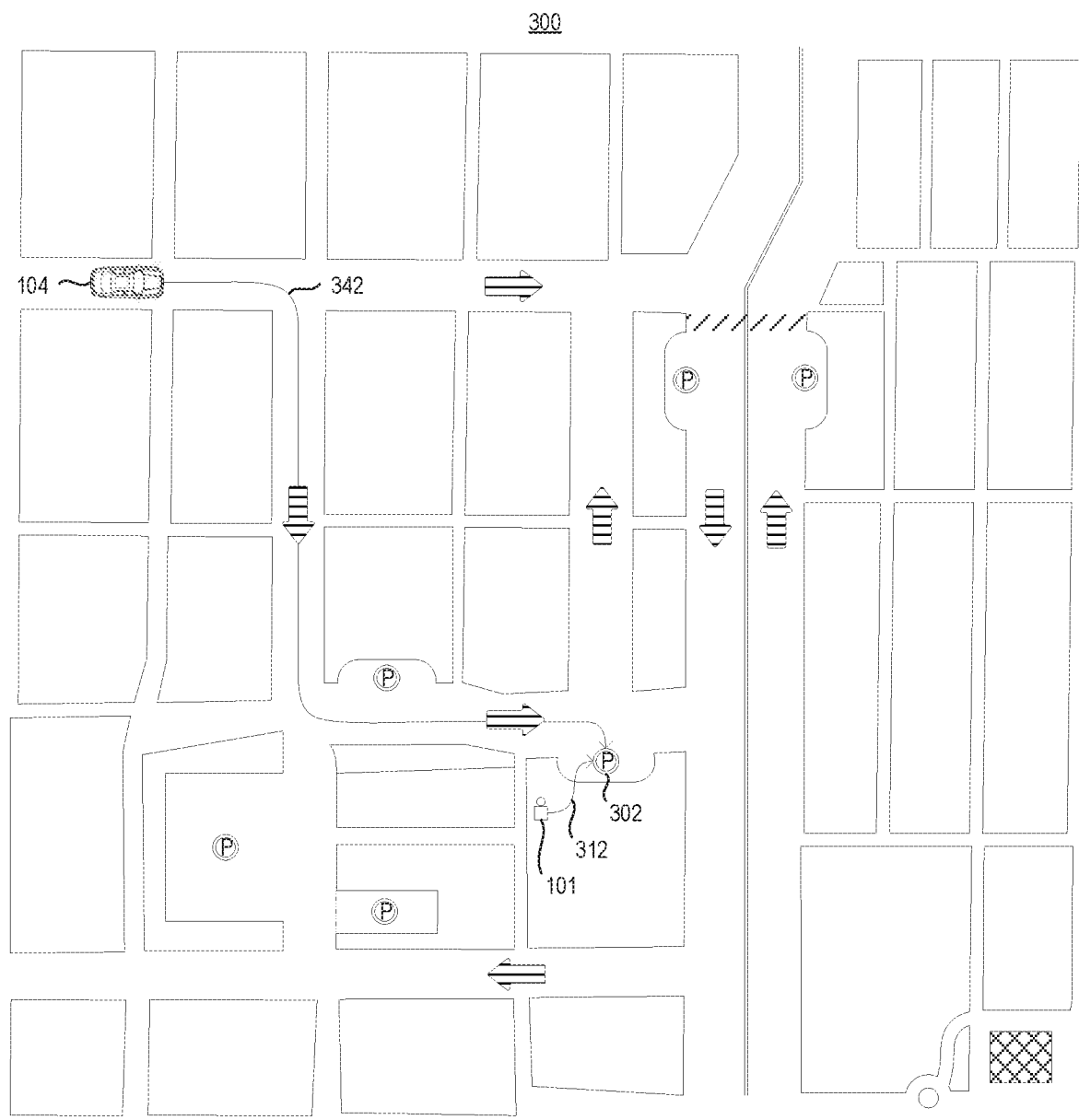
FIGS. 3A-3D depict diagrams of an example geographic area that illustrate examples of controlling an autonomous vehicle according to example embodiments of the present disclosure.

FIGS. 3A-3D depict diagrams that illustrate examples of controlling the vehicle 104 in response to a vehicle service request. In particular, FIG. 3A depicts a diagram 300 that illustrates an example of controlling the vehicle 104 in response to a first vehicle service request at a first location 302, for the user 101. In response to the first service request, the vehicle computing system 102 can obtain a vehicle route 342 that leads to the first location 302. The route 342 can be determined by the vehicle computing system 102 and/or by a remote computing device (e.g., the operations computing system 120). The vehicle computing system 102 can control the vehicle 104 to follow the vehicle route 342 to the first location 302, and can park itself. The user 101 can travel to the first location 302 where the vehicle 104 is parked, via a user route 312, so that the vehicle computing system 102 can provide the requested vehicle service to the user 101 (e.g., pick-up the user 101 for a transportation service).

Figure 3B:
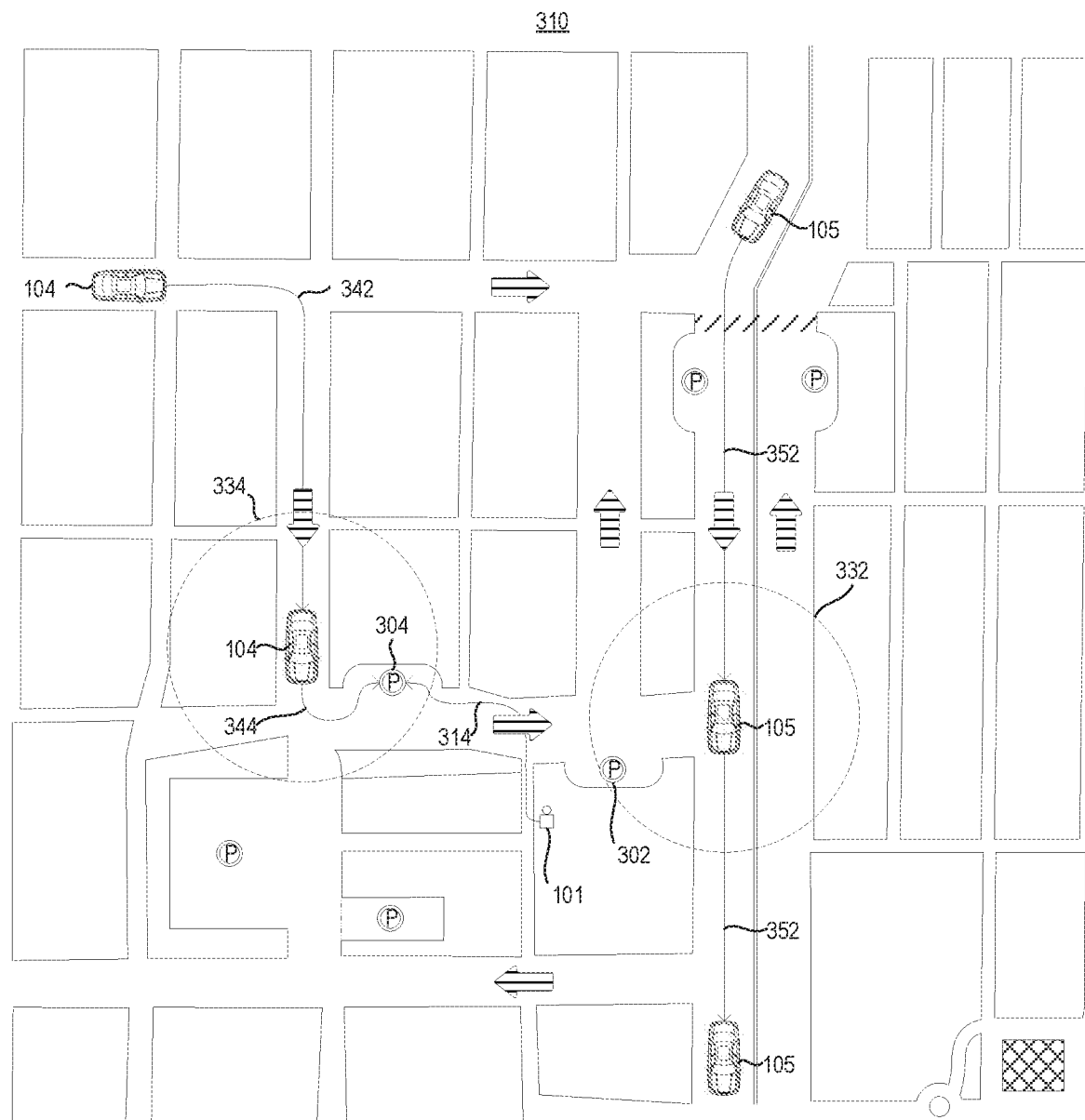

FIG. 3B depicts a diagram 310 that illustrates an example of controlling the vehicle 104 in response to a vehicle service request at the first location 302, when the first location 302 is occupied. In response to the service request, the vehicle computing system 102 can obtain the vehicle route 342 that leads to the first location 302, and control the vehicle 104 to follow the vehicle route 342. While the vehicle 104 is en route to the first location 302, the vehicle computing system 102 can determine that the first location 302 is occupied (e.g., by another vehicle).

The vehicle computing system 102 can determine that the first location is occupied based on sensor data obtained by the vehicle computing system 102, or sensor data obtained by one or more of the additional vehicle(s) 105. For example, the vehicle computing system 102 can obtain sensor data 109 via the sensor(s) 108, and process the sensor data 109 identify one or more object(s) in a surrounding environment of the autonomous vehicle that are obstructing and/or located within the first location. As another example, one or more of the additional vehicle(s) 105 can each obtain sensor data indicative of a surrounding environment of the additional vehicle(s) 105, respectively. Each of the additional vehicle(s) 105 can provide such sensor data (e.g., as raw sensor data, processed sensor data, or some part thereof) to the remote computing system(s) 103 and/or to one or more other autonomous vehicles (e.g., the vehicle 104, one or more other additional vehicle(s) 105, etc.).

In FIG. 3B, the additional vehicle 105 can travel along a vehicle route 352, for example, to provide a vehicle service to another user. The additional vehicle 105 can obtain first sensor data that corresponds to map region 332 that includes the first location 302. The first sensor data can indicate that the location 302 is occupied by another vehicle. The additional vehicle 105 can provide the first sensor data to the vehicle computing system 102 (e.g., via direct vehicle-to-vehicle communication, or one or more remote computing system(s) 103), and continue along the vehicle route 352. The vehicle computing system 102 can obtain the first sensor data (e.g., via the vehicle computing system 102), and store it in the memory system 116. The vehicle computing system 102 can determine that the first location is occupied based at least in part on the sensor data acquired by the other vehicle(s).

In response to the determination that the first location is occupied (e.g., blocked, obstruction, otherwise unavailable), the vehicle computing system 102 can obtain data indicative of a second location 304 to provide the vehicle service requested for the user 101. In some implementations, the vehicle computing system 102 can determine the second location 304 based on sensor data obtained by the vehicle computing system 102 and/or sensor data obtained by one or more of the additional vehicle(s) 105. In some implementations, the vehicle computing system 102 can obtain the second location 304 from a location database that includes one or more preferred locations for vehicle 104 to provide the vehicle service requested for the user 101.

In FIG. 3B, the vehicle computing system 102 can obtain second sensor data that corresponds to map region 334 that includes the second location 304, and change its destination to the second location 304. To do so, the vehicle computing system 102 can determine a new route from the current location of vehicle 104 and/or a future location to the second location 304. Additionally, or alternatively, the vehicle computing system 102 can request a route to the second location 304 from the operations computing system 120. Accordingly, the vehicle computing system can obtain a vehicle route 344 that leads to the second location 304. The vehicle computing system 102 can control the vehicle 104 to follow along the vehicle route 344 to the second location 304 (e.g., via autonomous navigation), and the vehicle computing system 102 can park the vehicle 104 at the second location 304. The vehicle computing system 102 can communicate the second location 304 to the user 101 (e.g., directly, via the operations computing system 120, etc.).

In some implementations, the vehicle computing system 102 can require the user 101 to acknowledge receipt of the second location 304, and accept or reject the change in destination. The user 101 can receive (e.g., via the user computing system 122) a communication indicating the second location 304. The user 101 can accept or reject the second location via the user computing system 122. In particular, the user 101 can accept or reject the second location via a user interface displayed on a display device of the user computing system 122. The user interface can correspond to a software application on the user computing system 122 by which the user 101 requests the vehicle service.

If the user 101 accepts the second location 304 as a new destination, then the vehicle computing system 102 can control the vehicle 104 to follow the vehicle route 344 to the second location 304. In response to the communication including the second location 304, the user 101 can travel to the second location 304 where the vehicle 104 is parked, via a user route 314, so that the vehicle computing system 102 can provide the requested vehicle service to the user. If the user 101 rejects the second location 304 as the new destination, then the vehicle computing system 102 can, for example, continue toward the first location 302, terminate the service request, and/or suggest an alternative location.

Figure 3C:
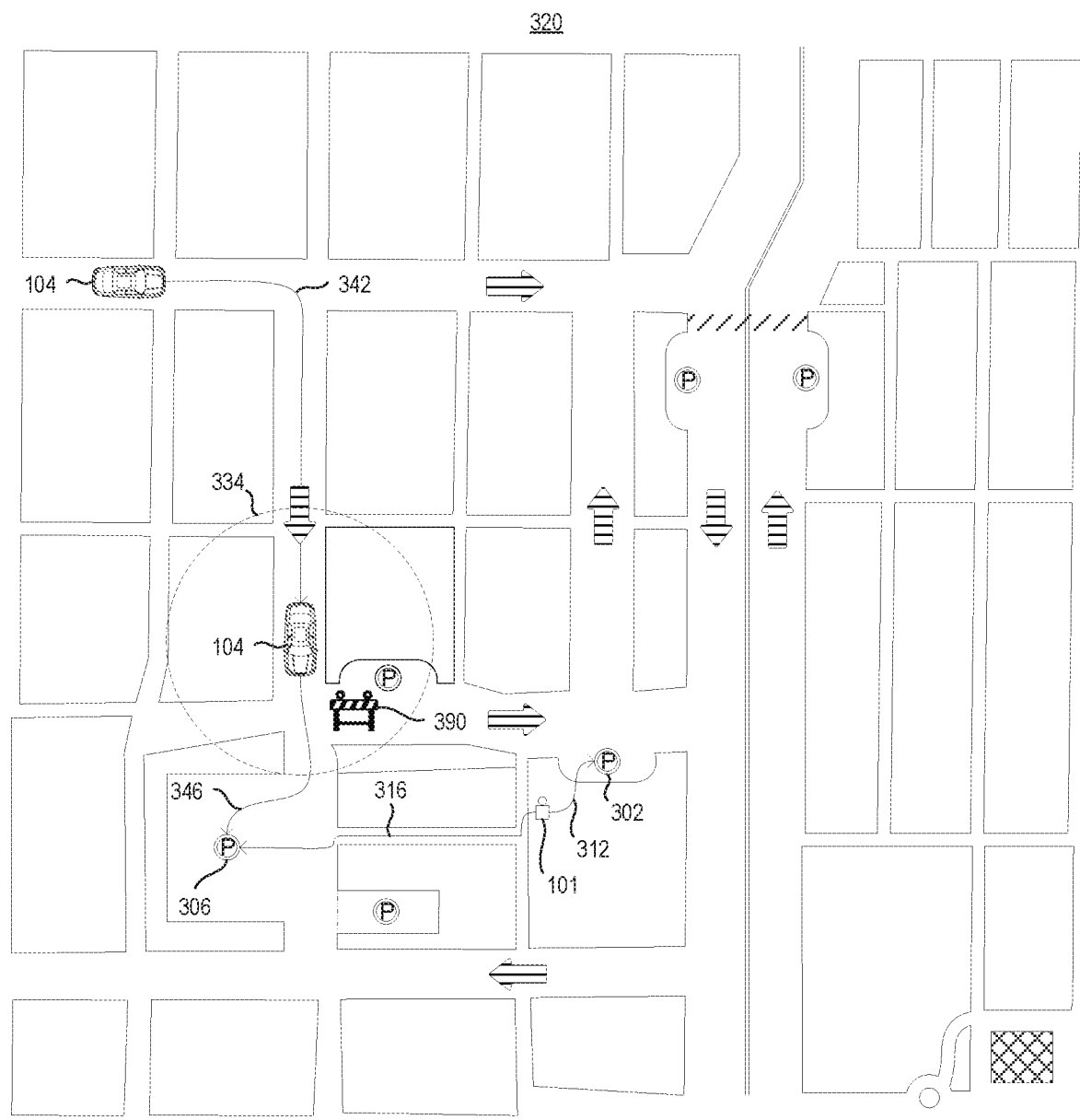

FIG. 3C depicts a diagram 320 that illustrates an example of controlling the vehicle 104 in response to a vehicle service request at the first location 302, when the first location 302 is obstructed. In response to the service request, the vehicle computing system 102 can obtain the vehicle route 342 that leads to the first location 302, and begin following the vehicle route 342. While the vehicle 104 is en route to the first location 302, the vehicle computing system 102 can determine that a barrier 390 is obstructing the vehicle 104 from reaching the first location 302 via the vehicle route 342. The vehicle computing system 102 can perceive the barrier 390 based on sensor data 109 obtained by the vehicle computing system 102, or sensor data obtained by one or more of the additional vehicle(s) 105. In FIG. 3C, the vehicle computing system 102 can obtain second sensor data that corresponds to a map region 334 that includes the barrier 390.

The vehicle computing system 102 can determine a second location 306 based at least in part on the second sensor data. The vehicle computing system 102 can determine the second location 306 based on sensor data obtained by the vehicle computing system 102 and/or sensor data obtained by one or more of the additional vehicle(s) 105. In some implementations, the vehicle computing system 102 can determine the second location 306 based on a location database that includes one or more preferred locations for the vehicle computing system 102 to provide the vehicle service requested for the user 101. The location database can be populated based on one or more criteria. For example, the location database can be populated with locations associated with low crime, reserved parking spots, ample street lights, etc. The vehicle computing system 102 can determine the second location 306 from among the one or more locations in the location database, that is nearest to the first location 302.

The vehicle computing system 102 can coordinate service for the user 101 at the second location. For example, the vehicle computing system 102 can change a destination of the vehicle 104 to the second location 306. The vehicle computing system 102 can communicate the second location 306 to the user 101 (as described herein). The vehicle computing system 102 can obtain a vehicle route 346 that leads to the second location 306. The vehicle computing system 102 can control the vehicle 104 to follow the vehicle route 346 to the second location 306, and the park itself at the second location 306. In response to receiving a communication indicating the second location 306, the user 101 can travel to the second location 306 where the vehicle 104 is parked, via a user route 316, so that the vehicle computing system 102 can provide the requested vehicle service to the user.

Figure 3D:
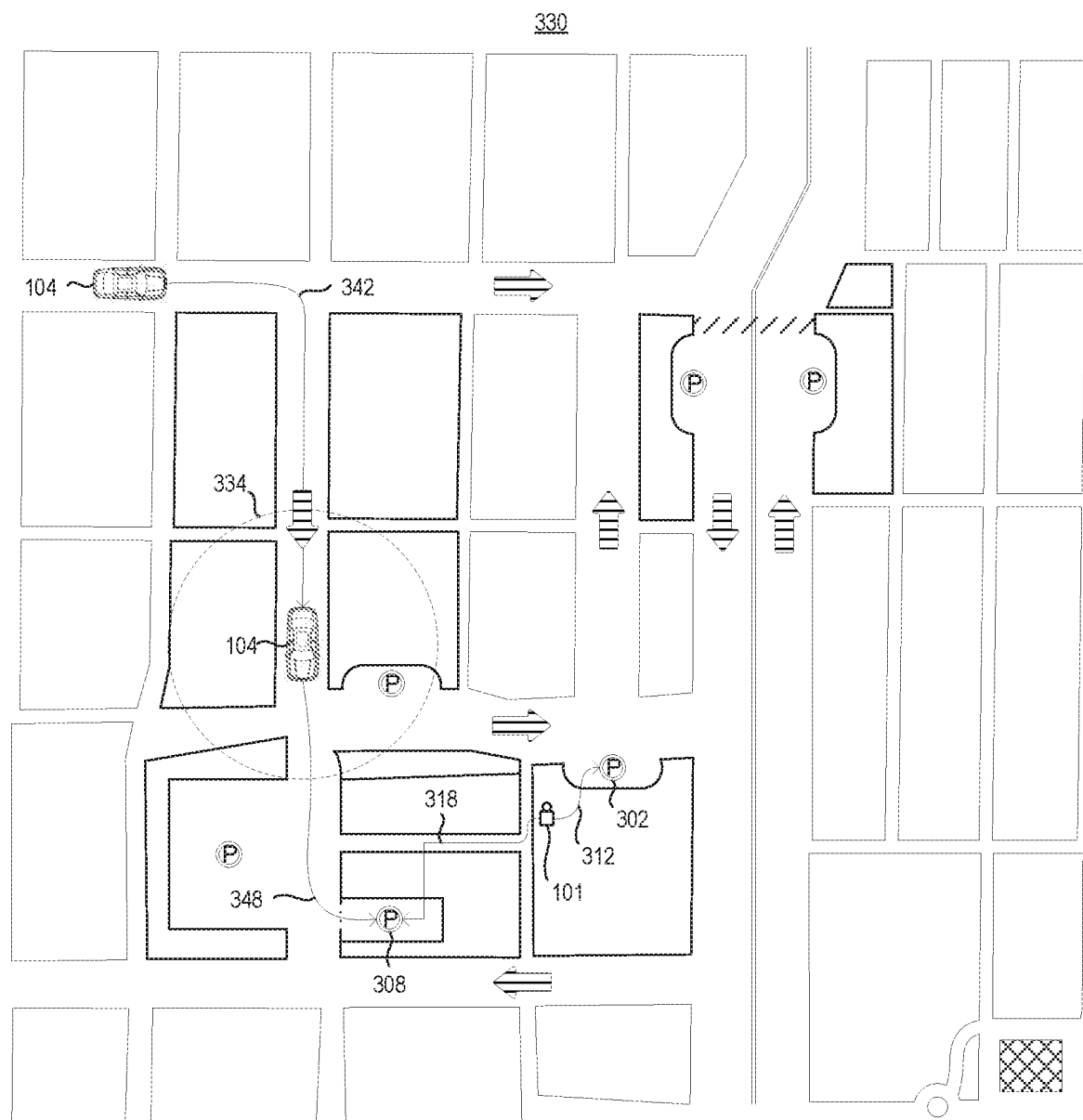

FIG. 3D depicts a diagram 330 that illustrates an example of controlling the vehicle 104 in response to a vehicle service request at the first location 302, when the first location 302 is determined to be unsafe. In response to the service request, the vehicle computing system 102 can obtain the vehicle route 342 that leads to the first location 302, and begin following the vehicle route 342. While the vehicle 104 is en route to the first location 302, the vehicle computing system 102 can determine that the first location 302 is in an unsafe region. For example, the vehicle computing system 102 can be updated in real-time with crime and safety alerts, and can determine that the first location 302 is unsafe if the vehicle computing system 102 receives an alert for an event within a predetermined range of the first location 302.

In response to a determination that the first location is unsafe, the vehicle computing system 102 can determine a second location 308 to provide the vehicle service requested for the user 101. The vehicle computing system 102 can determine the second location 308 based on sensor data obtained by the vehicle computing system 102 and/or sensor data obtained by one or more of the additional vehicle(s) 105. In some implementations, the vehicle computing system 102 can determine the second location 306 based on a location database that includes one or more preferred locations for vehicle computing system 102 to provide the vehicle service requested for the user 101. For example, the locations database can include locations associated with low crime, reserved parking spots, ample street lights, etc.

In FIG. 3D, the vehicle computing system 102 can change a destination of the vehicle 104 to the second location 308. The second location 308 can include, for example, a reserved parking spot inside a secured parking garage that is known to be a safe location. The vehicle computing system 102 can communicate the second location 308 to the user 101, obtain a vehicle route 348 that leads to the second location 308, follow the vehicle route 348 to the second location 308, and park itself at the second location 308. In response to receiving a communication indicating the second location 308 (e.g., via the user computing system 122), the user 101 can travel to the second location 308 where the vehicle 104 is parked, via a user route 318, so that the vehicle computing system 102 can provide the requested vehicle service to the user.

Figure 4A:
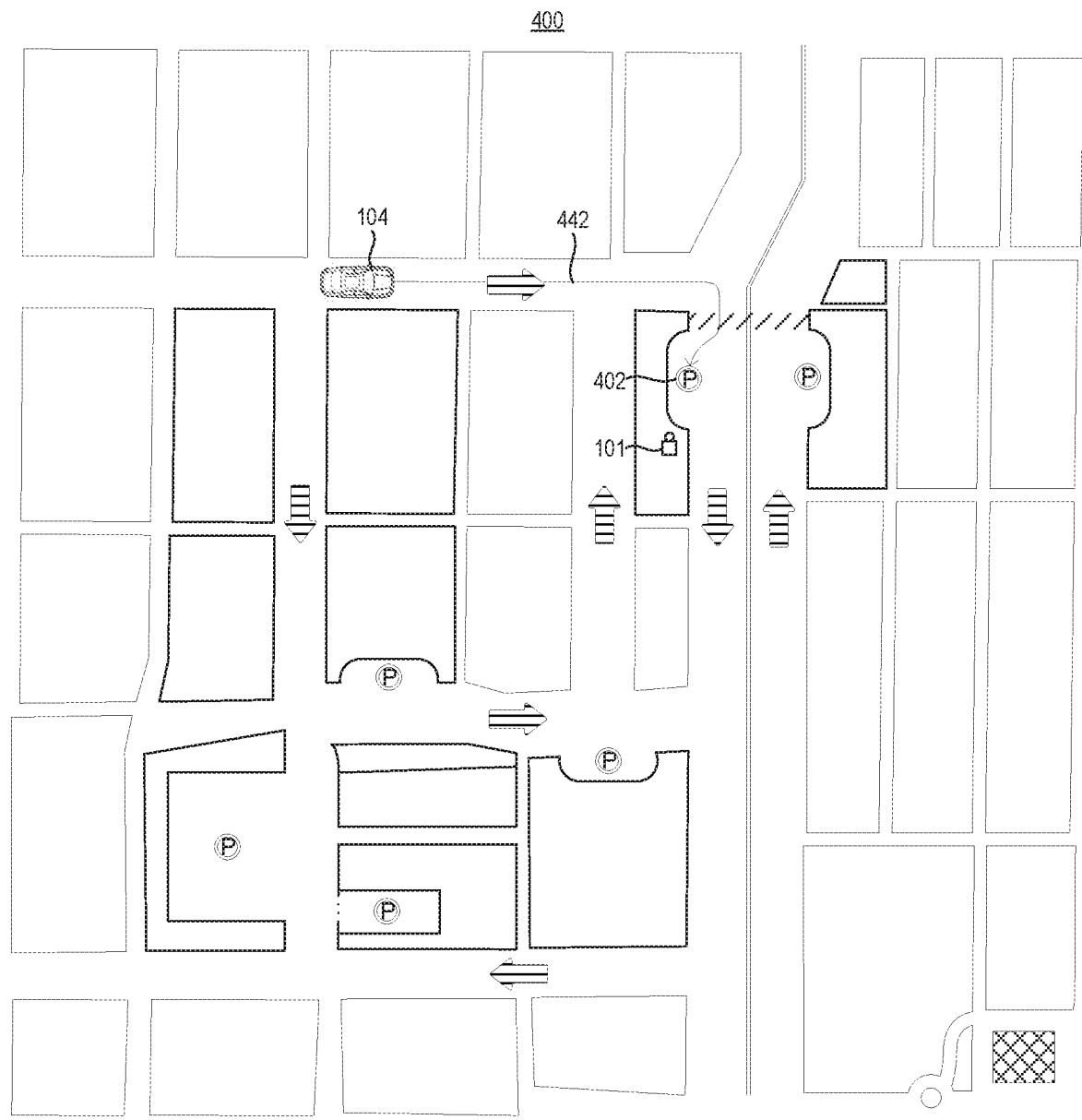
FIG. 4A-4D depict diagrams of an example geographic area that illustrate examples of controlling an autonomous vehicle according to example embodiments of the present disclosure.

FIGS. 4A-4D depict diagrams 400, 420, 430, 440 that illustrate examples of controlling the vehicle 104 in response to a vehicle service request. In particular, FIG. 4A depicts a diagram 400 that illustrates an example of controlling the vehicle 104 in response to a second vehicle service request at a first location 402, for the user 101. In response to obtaining data indicative of the second service request, the vehicle computing system 102 can obtain a vehicle route 442 that leads to the first location 402. The vehicle computing system 102 can control the vehicle 104 to follow the vehicle route 442 to the first location 402, and park the vehicle 104 at the first location 402. The user 101 can travel to the first location 402 where the vehicle 104 is parked, so that the vehicle computing system 102 can provide the requested vehicle service to the user 101.

Figure 4B:
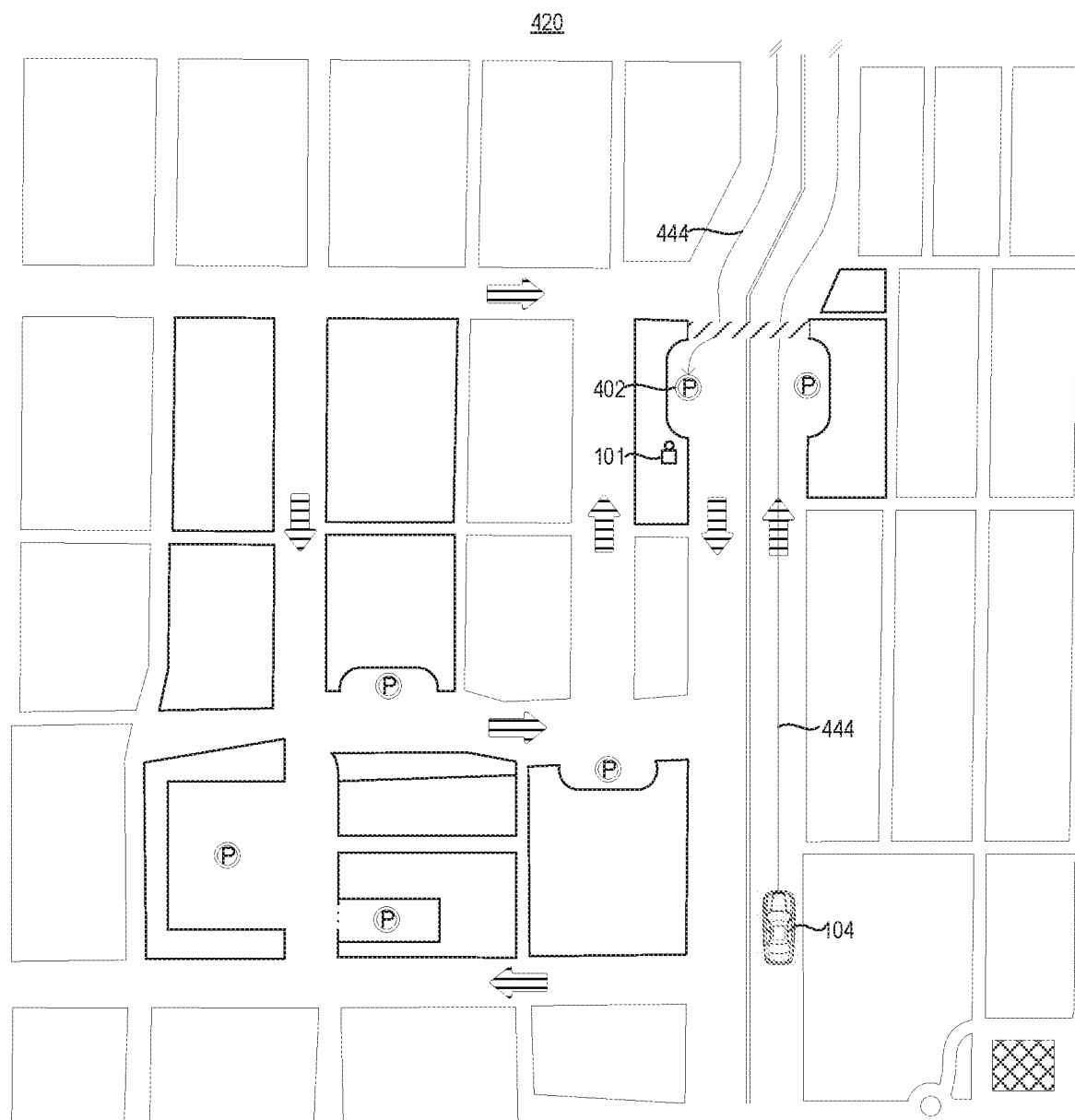
Figure 4C:
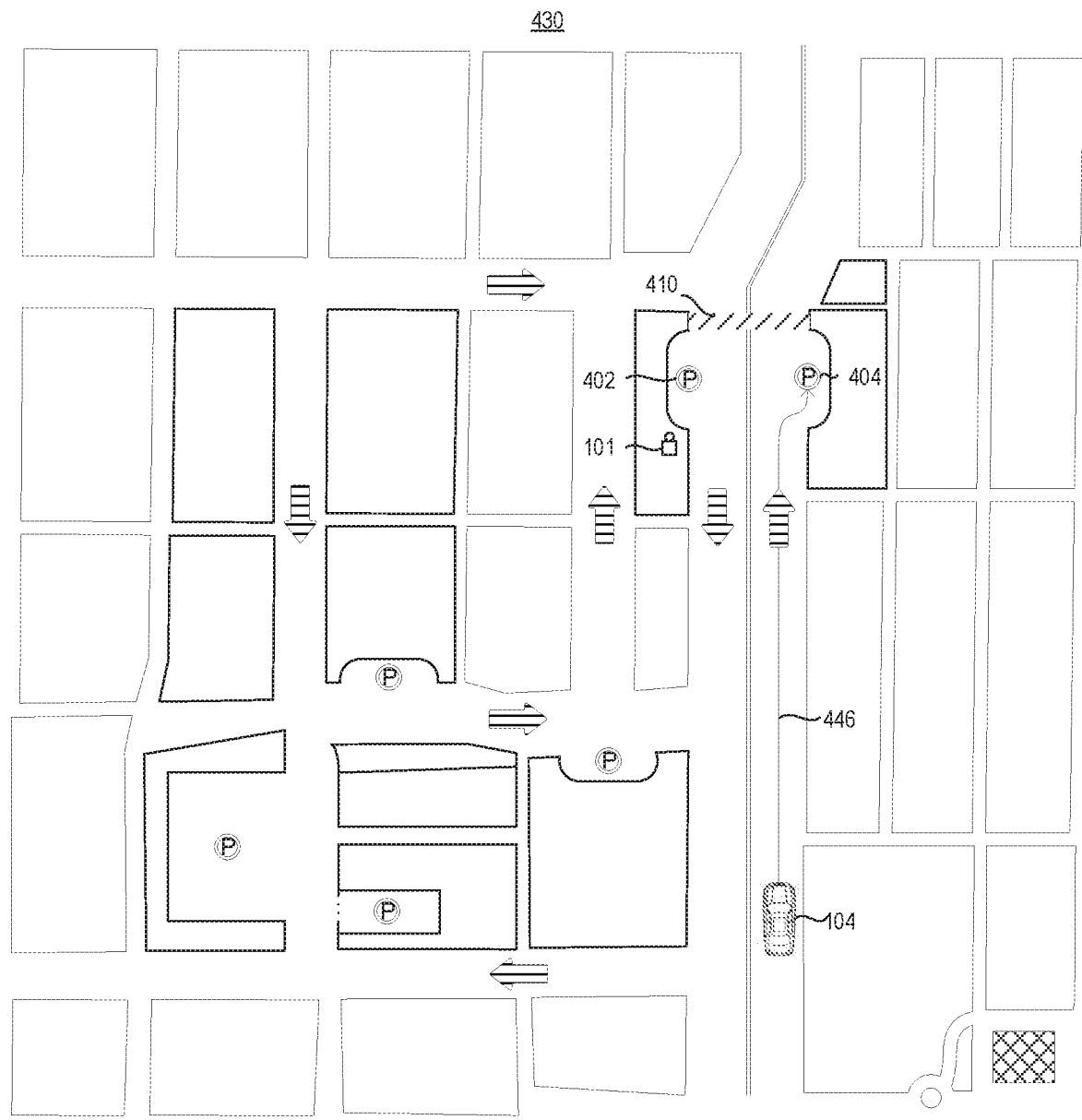

FIG. 4B and FIG. 4C depicts diagrams 420 and 430, respectively, that illustrate an example of controlling the vehicle 104 in response to the second vehicle service request, when the vehicle 104 is following a vehicle route 444 to the first location 402. As shown in FIG. 4B, the vehicle route 444 leads past the first location 402 (in an opposing travel lane) before turning around and leading to the second location 402. In particular, the vehicle route 444 can include a series of right-turns to cause the vehicle 104 to turn around, instead of including one or more left-turns that can clog traffic and be more difficult to implement. In FIG. 4C, the user 101 can determine a second location 404 for the second vehicle service request, and communicate the second location 404 to the vehicle computing system 102 as a new destination (as described herein), while the vehicle 104 is en route to the first location 402. In response, the vehicle computing system 102 can obtain a vehicle route 446 that leads to the second location 404, follow the vehicle route 446 to the second location 404, and park at the second location 404. The user 101 can cross the street at the crosswalk 410 (when it is safe to do so) to travel to the second location 404 where the vehicle 104 is parked, so that the vehicle computing system 102 can provide the requested vehicle service to the user 101.

Figure 4D:
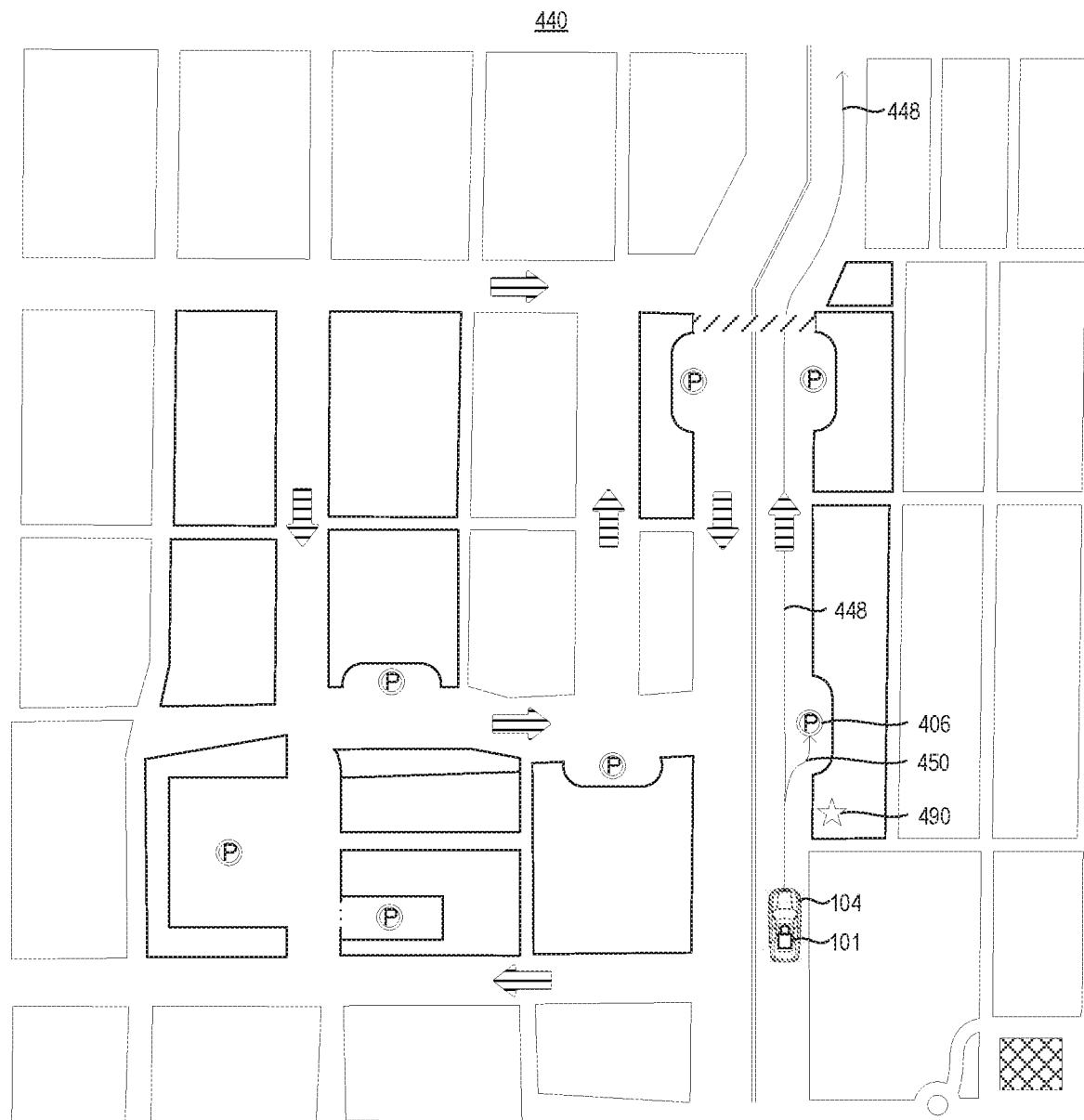

FIG. 4D depicts a diagram 440 that illustrates an example of controlling the vehicle 104 in response to the second vehicle service request, when the user 101 determines a second location 406. In FIG. 4D, the vehicle computing system 102 can control the vehicle 104 to follow a vehicle route 448 to a first location (not shown). The user 101 can identify an object of interest 490 (e.g., a friend, business, or other object that piques the user's interest) and a location that is associated with the object of interest 480. The user 101 can communicate the second location 406 to the vehicle computing system 102 via the user computing system 122. In response, the vehicle computing system 102 can obtain a vehicle route 450 that leads to the second location 406, follow the vehicle route 450 to the second location 406. The vehicle computing system 102 can park the vehicle 104 at the second location 406.

Figure 5:
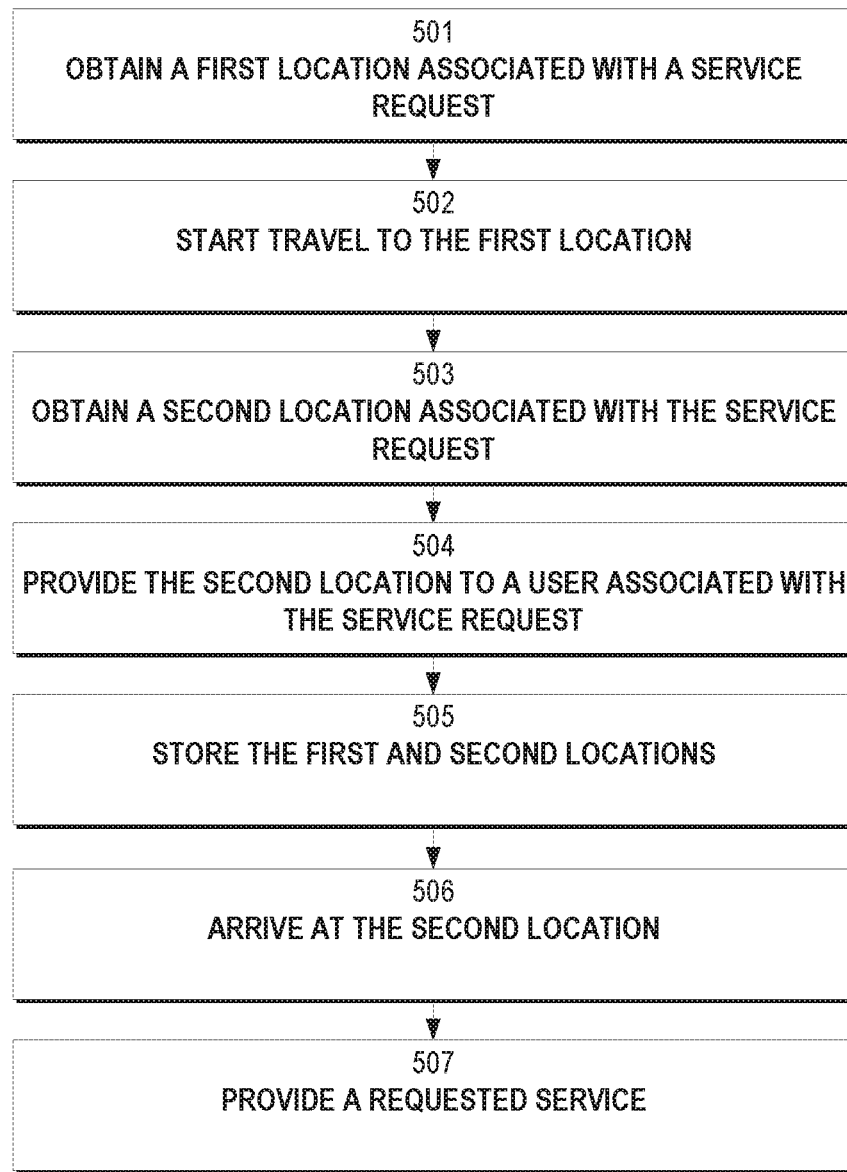
FIG. 5 depicts a flow diagram of controlling an autonomous vehicle according to example embodiments of the present disclosure.

FIG. 5 depicts flow diagrams of example method(s) for controlling an autonomous vehicle according to example embodiments of the present disclosure. One or more portion(s) of the method 500 can be implemented as operations by one or more computing system(s) such as, for example, the computing system(s) 102, 120, 122, 601, and 610 shown in FIGS. 1, 2, and 6. Moreover, one or more portion(s) of the method 500 can be implemented as an algorithm on the hardware components of the system(s) described herein (e.g., as in FIGS. 1, 2, and 6) to, for example, change a destination of an autonomous vehicle in real-time. FIG. 5 depicts elements performed in a particular order for purposes of illustration and discussion. Those of ordinary skill in the art, using the disclosures provided herein, will understand that the elements of any of the methods (e.g., of FIG. 5) discussed herein can be adapted, rearranged, expanded, omitted, combined, and/or modified in various ways without deviating from the scope of the present disclosure.

At (501), the method 500 can include obtaining a first location associated with a first service request. For example, the vehicle computing system 102 can receive data representing a first location associated with a service request from remote computing system(s) 103.

At (502), the method 500 can include starting travel to the first location. For example, the vehicle computing system 102 can obtain a first route that leads to the first location, and be controlled to travel in accordance with the first route. As described herein, the first route can be determined on-board the vehicle 104 by the vehicle computing system 102 and/or by a remote computing device, such as a computing device of the operations computing system 120 (e.g., in response to a service request).

At (503), the method 500 can include obtaining a second location associated with the first service request. For example, the vehicle computing system 102 can determine the second location for the first service request by receiving data representing the second location associated with the first service request when the vehicle 104 is en route to the first location. The vehicle computing system 102 can receive (e.g., directly and/or indirectly) the data representing the second location from a user computing system 122 associated with a user 101 that is associated with the first service request and who determines the second location. As another example, the vehicle computing system 102 can obtain sensor data indicative of a surrounding environment of the vehicle 104, and determine the second location based at least in part on the sensor data.

As another example, the vehicle computing system 102 can obtain data representing one or more predetermined service locations, and determine the second location based at least in part on the one or more predetermined service locations, as described herein.

As yet another example, the vehicle computing system 102 can identify data representing one or more previous service requests associated with the first location. The vehicle computing system 102 can identify data representing one or more previous second locations associated with each of the previous service requests. The vehicle computing system 102 can determine the second location based at least in part on the one or more previous second locations.

At (504), the method 500 can include providing the second location to a user associated with the service request. For example, the vehicle computing system 102 can provide (e.g., directly, indirectly via another computing device, etc.) data indicating the second location to a user computing system 122 associated with the user 101 associated with the service request. The vehicle computing system 102 can receive (e.g., directly, indirectly via another computing device, etc.) data from the user computing system 122 associated with the user 101 indicating an acknowledgement and/or acceptance of the second location.

At (505), the method 500 can include storing the first and second locations associated with the service request. For example, the vehicle computing system 102 can store data representing the first and second locations associated with the first service request in the memory system 116 (e.g., located on the vehicle 104).

At (506), the method 500 can include arriving at the second location. For example, the vehicle computing system 102 can control the vehicle 104 to travel to the second location in accordance with a second route that leads to the second location.

At (507), the method 500 can include providing a requested service. For example, the vehicle computing system 102 can control the vehicle 104 to provide the requested service at the second location. For instance, the vehicle computing system 102 can unlock the vehicle doors, trunk, etc. to allow the user 101 to board the vehicle 104 for a transportation service, place an item in the vehicle 104 for a courier service, retrieve an item for a delivery service, etc.

Figure 6:
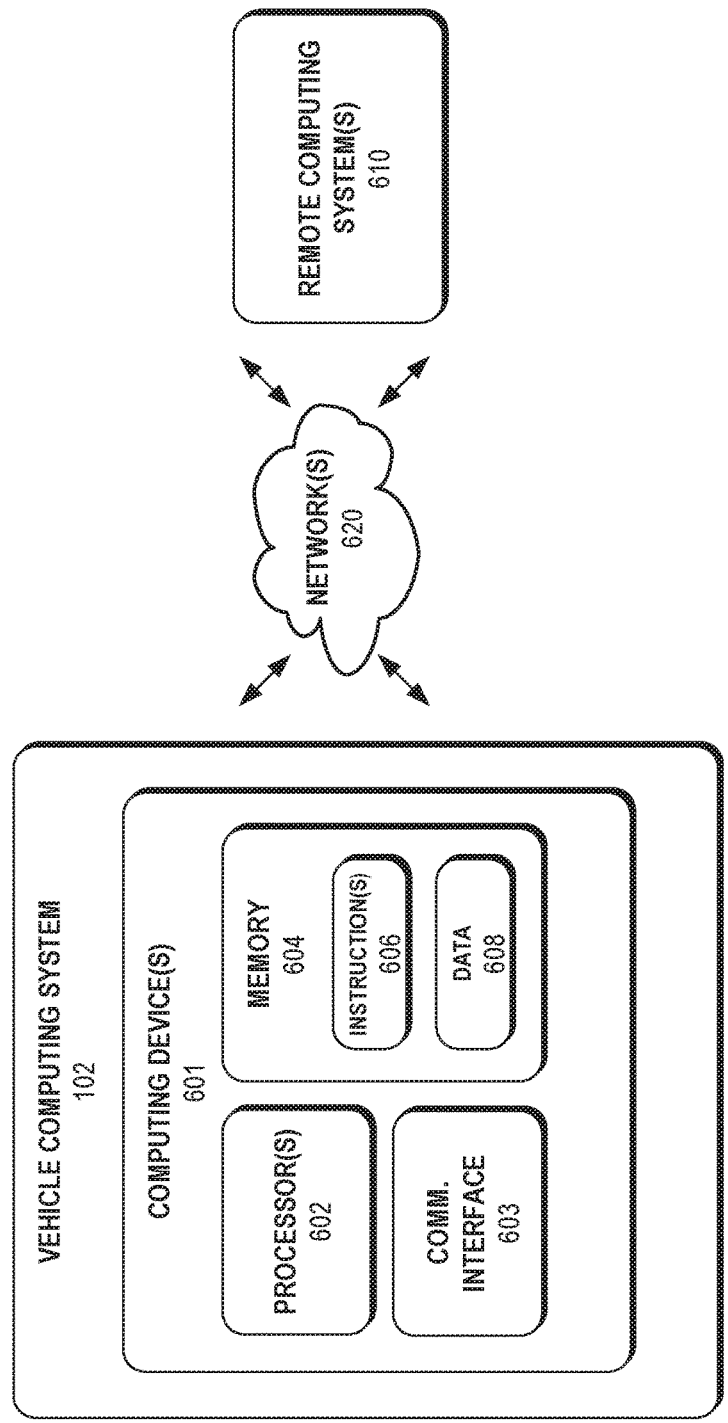
FIG. 6 depicts example system components according to example embodiments of the present disclosure.

FIG. 6 depicts an example computing system 600 according to example embodiments of the present disclosure. The example system 500 illustrated in FIG. 5 is provided as an example only. The components, systems, connections, and/or other aspects illustrated in FIG. 5 are optional and are provided as examples of what is possible, but not required, to implement the present disclosure. The example system 500 can include the vehicle computing system 102 of the vehicle 104 and, in some implementations, remote computing system(s) 510 including one or more remote computing system(s) that are remote from the vehicle 104 (e.g., the operations computing system 120) that can be communicatively coupled to one another over one or more networks 520. The remote computing system 510 can be associated with a central operations system and/or an entity associated with the vehicle 104 such as, for example, a vehicle owner, vehicle manager, fleet operator, service provider, etc.

The computing device(s) 501 of the vehicle computing system 102 can include processor(s) 502 and a memory 504. The one or more processors 502 can be any suitable processing device (e.g., a processor core, a microprocessor, an ASIC, a FPGA, a controller, a microcontroller, etc.) and can be one processor or a plurality of processors that are operatively connected. The memory 504 can include one or more non-transitory computer-readable storage media, such as RAM, ROM, EEPROM, EPROM, one or more memory devices, flash memory devices, etc., and combinations thereof.

The memory 504 can store information that can be accessed by the one or more processors 502. For instance, the memory 504 (e.g., one or more non-transitory computer-readable storage mediums, memory devices) on-board the vehicle 104 can include computer-readable instructions 506 that can be executed by the one or more processors 502. The instructions 506 can be software written in any suitable programming language or can be implemented in hardware. Additionally, or alternatively, the instructions 506 can be executed in logically and/or virtually separate threads on processor(s) 502.

For example, the memory 504 on-board the vehicle 104 can store instructions 506 that when executed by the one or more processors 502 on-board the vehicle 104 cause the one or more processors 502 (the vehicle computing system 102) to perform operations such as any of the operations and functions of the vehicle computing system 102, as described herein, one or more operations of method 500, and/or any other operations and functions of the vehicle computing system 102, as described herein.

The memory 504 can store data 508 that can be obtained, received, accessed, written, manipulated, created, and/or stored. The data 508 can include, for instance, data associated with perception, prediction, motion plan, maps, service request(s), locations (e.g., initial locations, changed destinations, preferred locations, etc.) and/or other data/information as described herein. In some implementations, the computing device(s) 501 can obtain data from one or more memory device(s) that are remote from the vehicle 104.

The computing device(s) 501 can also include a communication interface 503 used to communicate with one or more other system(s) on-board the vehicle 104 and/or a remote computing device that is remote from the vehicle 104 (e.g., of remote computing system(s) 510). The communication interface 503 can include any circuits, components, software, etc. for communicating via one or more networks (e.g., 520). In some implementations, the communication interface 503 can include, for example, one or more of a communications controller, receiver, transceiver, transmitter, port, conductors, software, and/or hardware for communicating data.

The network(s) 520 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 520 can be accomplished, for instance, via a communication interface using any type of protocol, protection scheme, encoding, format, packaging, etc.

The remote computing system 510 can include one or more remote computing devices that are remote from the vehicle computing system 102. The remote computing devices can include components (e.g., processor(s), memory, instructions, data) similar to that described herein for the computing device(s) 501. Moreover, the remote computing system(s) 510 can be configured to perform one or more operations of the operations computing system 120, as described herein. Moreover, the computing systems of other vehicles described herein can include components similar to that of vehicle computing system 102.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An autonomous vehicle comprising:
one or more processors; and
one or more tangible, non-transitory, computer readable media that collectively store instructions that when executed by the one or more processors cause the one or more processors to perform operations, the operations comprising:
receiving data indicative of a first location associated with a first service request for a first user;
controlling the autonomous vehicle to travel in accordance with a first route that leads to the first location associated with the first service request for the first user;
determining a second location for the first service request for the first user when the autonomous vehicle is en route to the first location; and
communicating data indicative of the second location for the first service request.

2. The autonomous vehicle of claim 1, wherein the operations further comprise:
receiving data indicative of an acceptance or a rejection of the second location.

3. The autonomous vehicle of claim 2, wherein the operations further comprise:
in response to receiving data indicative of the acceptance of the second location, controlling the autonomous vehicle to travel to the second location for the first service request.

4. The autonomous vehicle of claim 2, wherein the operations further comprise:
in response to receiving data indicative of the rejection of the second location, controlling the autonomous vehicle to continue travelling to the first location, terminating the first service request, or determining a third location.

5. The autonomous vehicle of claim 2, wherein the acceptance or the rejection of the second location comprises an acceptance or a rejection by the first user.

6. The autonomous vehicle of claim 1, further comprising:
determining that the first location associated with the first service request for the first user is at least one of occupied, obstructed, or unsafe.

7. The autonomous vehicle of claim 6, wherein determining that the first location associated with the first service request for the first user is at least one of occupied, obstructed, or unsafe comprises:
obtaining data associated with the first location from a computing system that is remote from the autonomous vehicle; and
determining that the first location associated with the first service request for the first user is at least one of occupied, obstructed, or unsafe based at least in part on the data associated with the first location obtain from the computing system that is remote from the autonomous vehicle.

8. The autonomous vehicle of claim 6, wherein determining that the first location associated with the first service request for the first user is at least one of occupied, obstructed, or unsafe comprises:
determining that the first location associated with the first service request for the first user is at least one of occupied, obstructed, or unsafe based at least in part on data obtained from another autonomous vehicle.

9. The autonomous vehicle of claim 6, wherein determining that the first location associated with the first service request for the first user is at least one of occupied, obstructed, or unsafe comprises:
obtaining sensor data indicative of a surrounding environment of the autonomous vehicle; and
determining that the first location associated with the first service request for the first user is at least one of occupied, obstructed, or unsafe based at least in part on the sensor data indicative of the surrounding environment of the autonomous vehicle.

10. The autonomous vehicle of claim 1, wherein determining the second location for the first service request for the first user when the autonomous vehicle is en route to the first location comprises:
determining the second location for the first service request for the first user when the autonomous vehicle is en route to the first location based at least in part on data obtained from another autonomous vehicle.

11. The autonomous vehicle of claim 1, wherein determining the second location for the first service request for the first user when the autonomous vehicle is en route to the first location comprises:
determining the second location for the first service request for the first user when the autonomous vehicle is en route to the first location based at least in part on a location database comprising on one or more predetermined locations for the autonomous vehicle.

12. A computing system comprising:
one or more processors; and
one or more tangible, non-transitory, computer readable media that collectively store instructions that when executed by the one or more processors cause the computing system to perform operations, the operations comprising:
receiving data indicative of a first service request associated with a first user;
selecting an autonomous vehicle to perform a vehicle service associated with the first service request;
providing data indicative of a first location associated with the first service request for the first user to which the autonomous vehicle is to travel;
determining data indicative of a second location for the first service request for the first user when the autonomous vehicle is en route to the first location; and
providing data to the autonomous vehicle to travel to the second location for the first service request.

13. The computing system of claim 12, wherein the first location is a parking spot and wherein the first location is occupied or obstructed.

14. The computing system of claim 12, wherein the second location is accepted by the first user.

15. The computing system of claim 12, wherein the second location is associated with user input provided to a mobile computing device.

16. The computing system of claim 12, wherein the first service request comprises a request for a delivery service.

17. The computing system of claim 12, wherein the second location is associated with the user providing an item to the autonomous vehicle or retrieving an item from the autonomous vehicle.

18. A computer-implemented method for autonomous vehicle control, the method comprising:
receiving, by a computing system comprising one or more computing devices, data representing a first location associated with a first service request for a first user;
controlling, by the computing system, an autonomous vehicle to travel to the first location associated with the first service request for the first user;

receiving, by the computing system, a second location for the first service request for the first user when the autonomous vehicle is en route to the first location; and controlling, by the computing system, the autonomous vehicle to travel to the second location for the first service request.

19. The computer-implemented method of claim 18, wherein the autonomous vehicle is configured to enter into a holding pattern in the vicinity of the first location until the autonomous vehicle receives a confirmation associated with the second location.

20. The computer-implemented method of claim 18, wherein the operations further comprise:

receiving, by the computing system, data representing the user's acceptance of the second location.

* * * * *